Oct. 6, 1953  B. E. HOUSE  2,654,446
BRAKE ADJUSTER
Filed Oct. 7, 1947  3 Sheets-Sheet 1

INVENTOR.
BRYAN E. HOUSE
BY
D.J. Plante
ATTORNEY

Oct. 6, 1953  B. E. HOUSE  2,654,446
BRAKE ADJUSTER
Filed Oct. 7, 1947  3 Sheets-Sheet 2
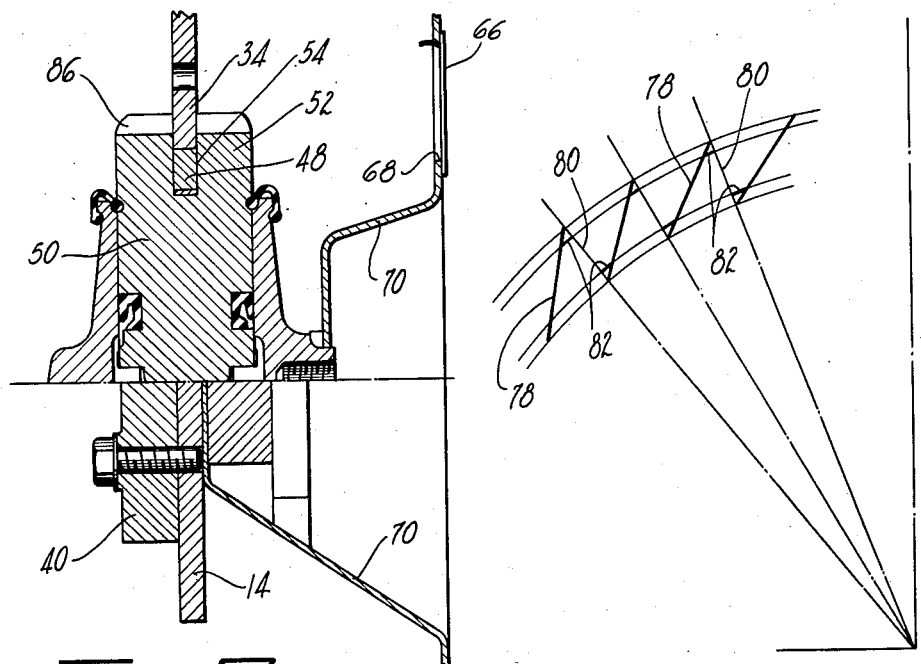
Fig. 2
Fig. 4
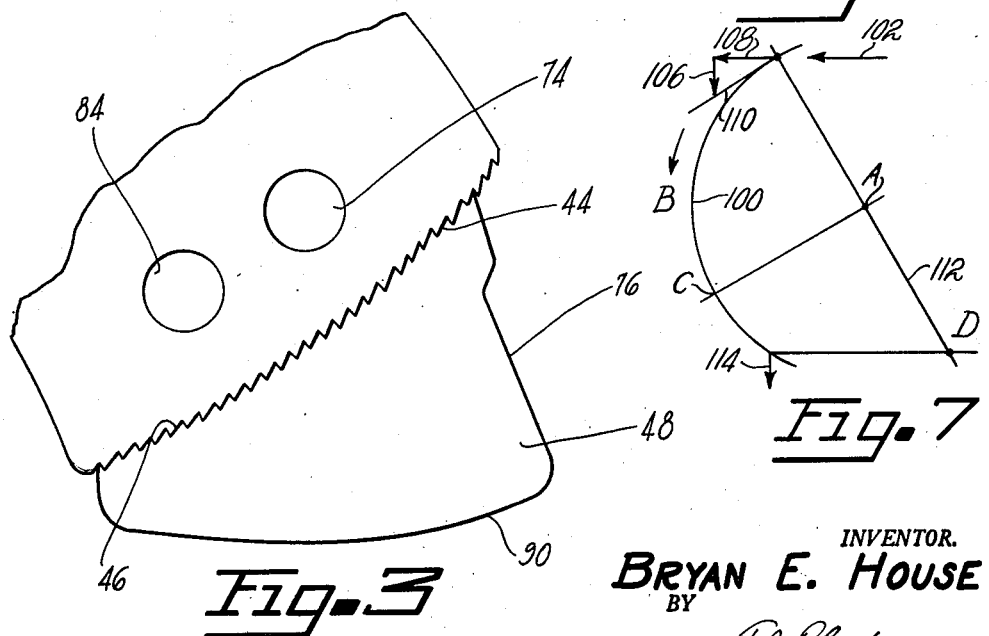
Fig. 3
Fig. 7
INVENTOR.
BRYAN E. HOUSE
BY
T. J. Plante
ATTORNEY

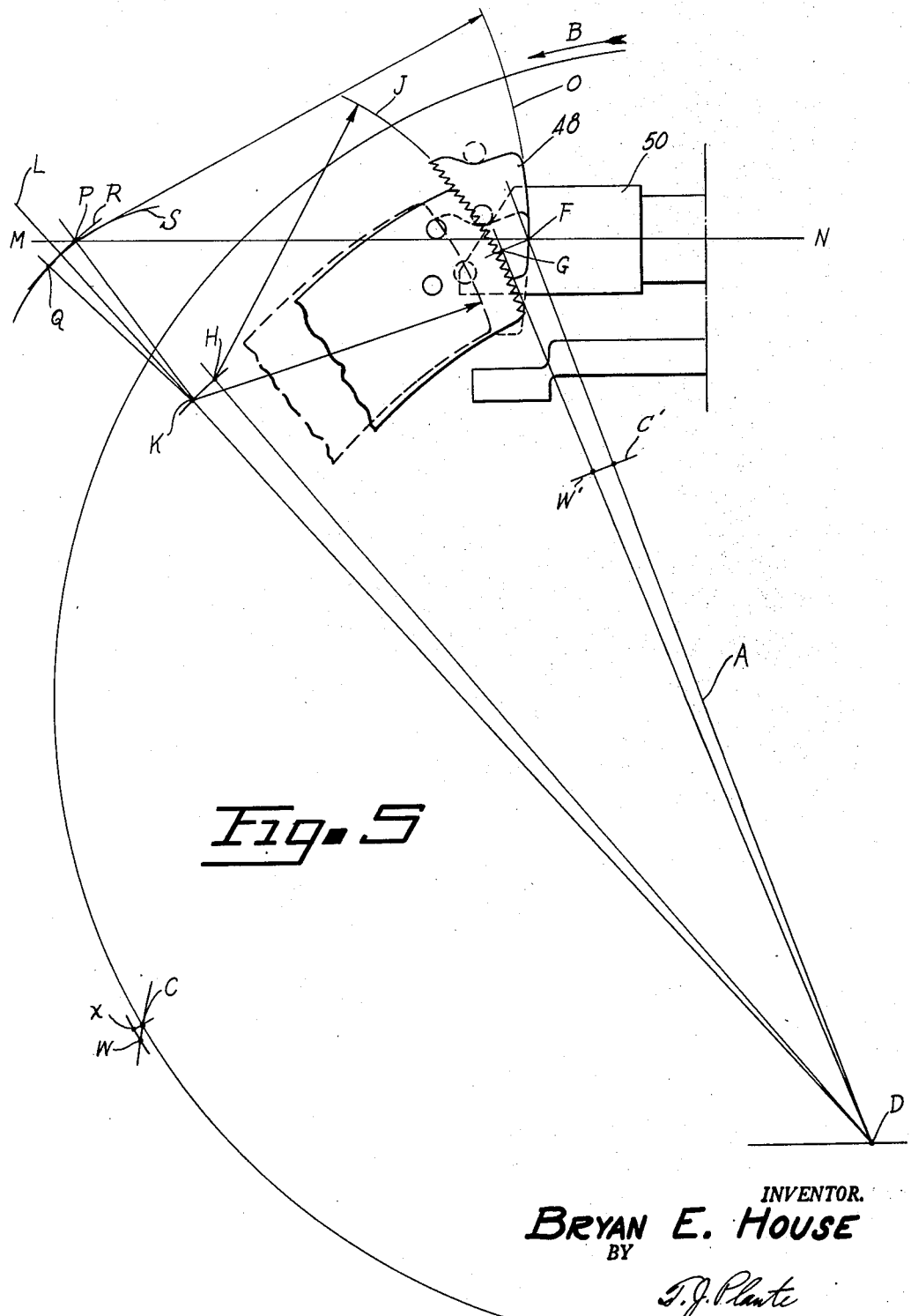

Patented Oct. 6, 1953

2,654,446

UNITED STATES PATENT OFFICE 2,654,446

BRAKE ADJUSTER

Bryan E. House, South Bend, Ind., assignor to Bendix Aviation Corporation, South Bend, Ind., a corporation of Delaware Application October 7, 1947, Serial No. 778,292

4 Claims. (Cl. 188—79.5)

This invention relates to improvements in brake adjustors for drum-type brakes, in which adjustment is accomplished by changing the retracted position of the brake shoe, as, for example, by increasing the distance between the brake shoe and a fixed stop member.

Heretofore, adjustors of this general nature have been so constructed as to include cooperating threaded members. In other words, the adjustment has been accomplished by turning an adjusting screw or an adjusting sleeve and thereby moving the screw in a direction to cause a change in the position of the brake shoe. Threaded adjustors are sometimes a source of trouble due to freezing or locking of the threads because of rust.

An object of the present invention is to avoid entirely the use of threaded members in a brake adjustor and thereby obviate the possibility of a locked, or jammed, adjustor.

A further object of the present invention is to provide brake adjusting means which will simplify and make easier the job of taking up shoe clearance.

A still further object is to provide brake adjusting means which will automatically insure the required minimum clearance after adjustment without requiring the mechanic to back off the adjustor a given distance.

Yet another object of the present invention is to provide an improved adjusting tool to be used in conjunction with my novel adjustor.

Other objects and features of the present invention will become apparent in the course of the following description, wherein reference is had to the accompanying drawings, in which:

Figure 2 is a section taken on the line 2—2 of Figure 1;

Figure 3 is a closeup of the brake adjustor of Figure 1;

Figure 4 is an enlarged view of the teeth of the brake adjustor;

Figure 5 is a diagram illustrating the principles which govern the design of the brake adjustor.

Figure 1:
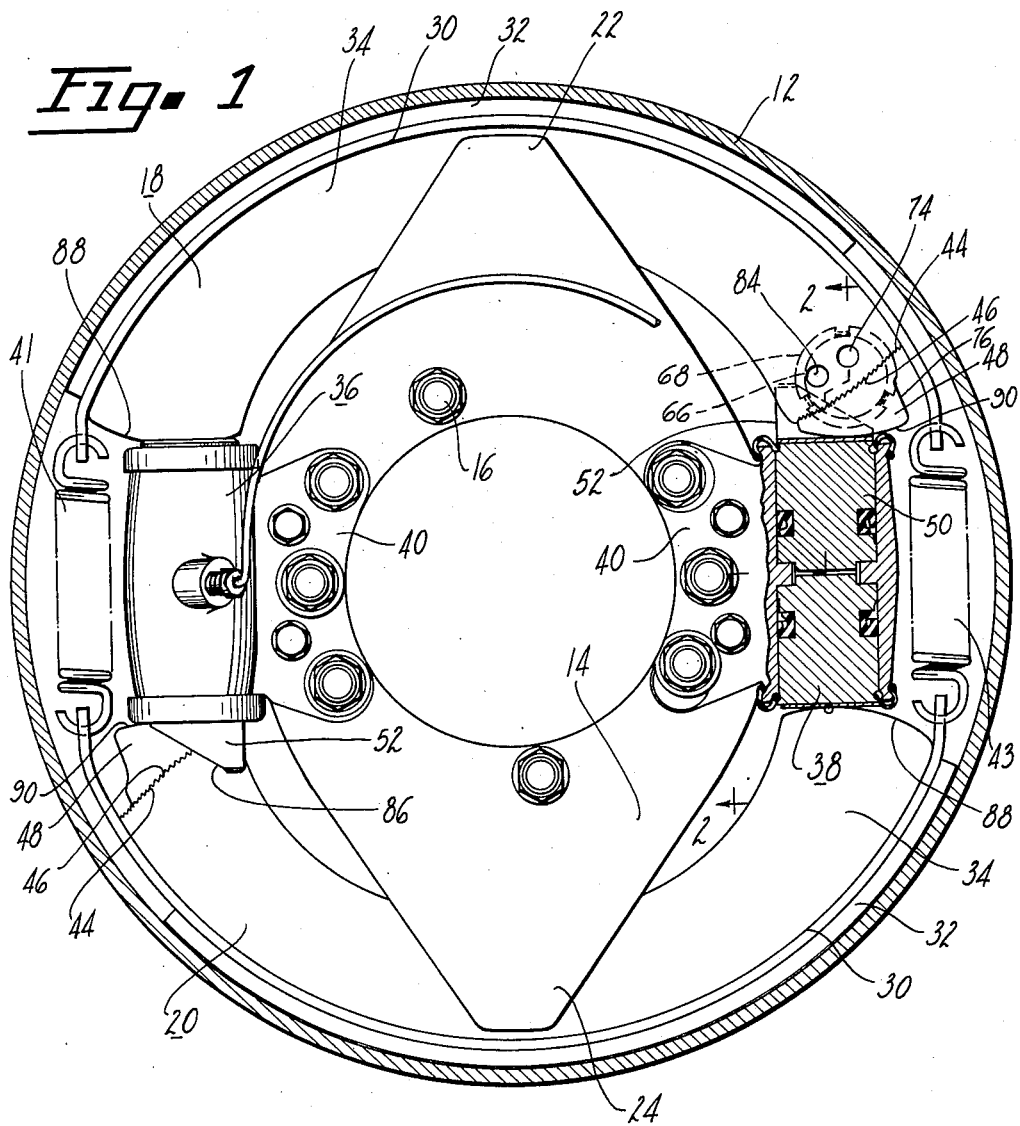
Figure 1 is a side elevation of a brake assembly which incorporates my improved adjusting means.

Referring to Figure 1, the brake includes the usual brake drum 12 and the supporting member for the brake shoes, such as the supporting plate 14, which is adapted to be secured by means of fastening members 16 to a fixed part of the vehicle, or other device, with which the brake is associated. The supporting plate 14 may be formed by any desired process, but in the illustrated brake it is shown as a stamped plate. Brake shoes 18 and 20 are carried by the supporting plate and are centrally guided by arms 22 and 24 formed on the plate. The shoes are of the conventional T-section type, each having a rim 30, a lining 32 carried by the rim, and a web 34 lying in a plane normal to the rim.

My improved adjustor can be utilized in any preferred form of brake arrangement, that is, it is equally applicable to brakes having two individually-shiftable shoes, to brakes having two shoes permanently anchored at one side of the supporting plate, and to brakes having two articulated shoes which constitute a full-floating friction element. The form of brake in which I have chosen to illustrate my improved adjustor is that in which the two shoes are individually self-energizing, each end of each shoe being capable of serving either as the anchoring end of the shoe, or as the applying end of the shoe. Although mechanical actuation of the shoe may, of course, be utilized, I have shown hydraulic wheel cylinders 36 and 38 as the actuating means, the cylinders 36 and 38 conveniently serving also as anchors for the shoes. The cylinders 36 and 38 are mounted on supporting plate 14 by means of integral flanges 40, which are secured to the face of the supporting plate. Brake shoes 18 and 20 are normally retained in released position by means of return springs 41 and 43 which extend across the brake from shoe to shoe and draw the shoes inwardly against the pistons in the wheel cylinders.

Fluid under pressure, admitted to the cylinders 36 and 38 between the pistons thereof, exerts a spreading effort on the pistons, moving both ends of both shoes toward the brake drum. As the shoes engage the drum, the wrapping effect of the drum on the shoes will cause one end of each shoe to anchor while the applying effort is exerted at the opposite end of the shoe. The anchoring torque is transmitted from each shoe to one of the pistons of one of the wheel cylinders, and thus is absorbed by the fixed plate 14. When the fluid pressure is removed, the springs 41 and 42 return the shoes and the wheel cylinder pistons to released position.

With successive applications of the brake, the linings 32 of the shoes are gradually worn down. This means that there is an increased clearance between the outer surface of the linings and the drum, when the shoes are in released position, and consequently greater pedal travel is required before friction is developed in subsequent applications of the brake. In order to compensate for the brake lining wear, the brake must be adjusted to reduce the clearance between the outer shoe surfaces and the drum. I propose to obtain this adjustment by novel mechanism.

One end of the web of each shoe is provided with teeth 44 extending along the full end surface of the web. Each toothed, or serrated, web end is engaged by a corresponding toothed, or serrated, surface 46 on an adjustor 48, which is located between the serrated end of the shoe and the respective wheel cylinder piston 50. The adjustors 48, one of which is shown enlarged in Figure 3, are flat, substantially wedge-shaped members, which may be formed by stamping, and are therefore inexpensive to manufacture. The serrated edge and the edge on the opposite side of the adjustor 48 are arcuately shaped so that with any radial position of the adjustor, the force exerted on or by piston 50 will be on a line corresponding to its axis. The method of calculating the respective curvatures of these two edges is explained hereafter. Adjustment to take up the shoe clearance is accomplished by causing the respective adjustor 48 to move in such a direction as to bring the thicker part of the adjustor between the end of the shoe and the piston, which serves both as anchor for the shoe, and as the stop member for the shoe in released position. In the illustrated form of the invention the adjustor 48 is moved inwardly toward the center of the brake assembly to urge the shoe toward the drum.

Each of the pistons 50 has a portion 52 extending outwardly beyond the end of the wheel cylinder, and provided with a slot 54, within which is guided the respective adjustor 48 and the end of the shoe web. The shoe web and the adjustor are therefore kept in alignment, and the combination of shoe and adjustor may be considered as constituting a unitary shoe construction which is adjustable in length. The adjusted position of the adjustor with respect to the shoe is, of course, maintained by engagement of the complementary serrated surfaces.

Figure 6:
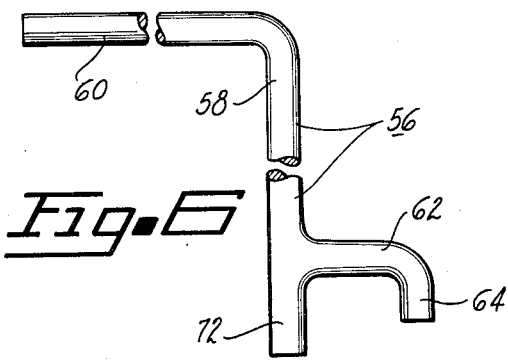
Figure 6 shows an adjusting tool for use in conjunction with my improved adjustor.

In order to move the adjustors with the greatest facility, I prefer to provide an improved adjusting tool 56, shown in Figure 6. This tool has a stem 58 bent over at one end to form an arm 60 extending at right angles to the stem, and near the opposite end of the stem is a transversely extending arm 62 having a projecting portion 64 which extends parallel to the stem 58, but does not extend as far as the stem.

When it is desired to adjust the brake, after the cap 66 has been removed from the opening 68 in cover plate 70, the end of the tool having the arm 62 is inserted through opening 68 and the end 72 of the stem of the tool is inserted in opening 74 provided in the shoe web. The tool is now manipulated until the projecting portion 64 bears against the outer edge 76 of the adjustor. When the tool has thus been brought into position, a twisting force exerted on arm 60 will have a two-fold effect: (1)—Acting against the edge of opening 74, it will tend to lift the shoe away from the adjustor; and (2)—Acting against the edge 76 of the adjustor, it will push the adjustor inwardly toward the center of the brake assembly. As the adjustor moves inwardly, the wider part of the adjustor is brought between the end of the shoe and the piston 50, to take up the clearance between the shoe and the drum. When the adjustor has been moved as far inwardly as possible, the adjusting tool is removed, and the adjusting operation is complete.

Because of the engagement of the teeth on the adjustor with those on the end of the shoe, the shoe will automatically drop back after each adjustment. The height of the teeth on the adjustor and on the shoe determines the minimum automatic brake clearance. Because of this, it is impossible to over-adjust the brake shoe, since the adjustor will fail to move over the next tooth if there is insufficient clearance.

The number of teeth provided on the adjustor and on the shoe determines the pitch of the teeth because the extent of the serrated surface is limited. The pitch of the teeth in turn controls the amount of adjustment per notch, and therefore determines the fineness of adjustment. The pitch of the teeth can, of course, be varied, provided the height or slope of the teeth is also varied. Both the height and the slope, or angle, of the teeth are limiting factors. The height must be sufficient to insure a predetermined minimum clearance, as explained above. The slope of the teeth should be such that the effort required to force the adjustor over the teeth is not excessive, because it is not practicable to completely lift the shoe out of contact with the adjustor, and there is a sliding action between the teeth of the adjustor and the teeth on the end of the shoe.

Referring to Figure 4, it will be noted that the slope on the side 78 of each tooth is relatively slight, i. e. the angle of the tooth with the pitch line is relatively small, whereas the side 80 of each tooth is normal to the pitch line or, in other words, lies on a radius of the pitch circle. It is not necessary to provide teeth shaped as shown in Figure 4. The primary reason for the abruptness of the drop once the top of the teeth has been passed, is to permit a more gradual slope on the opposite side of the teeth and thereby minimize the effort required to move the adjustor in the adjusting direction. Assuming that the teeth must have a certain height and that the pitch must not be more than a certain amount, the angle at one side of the teeth can be reduced only by increasing the angle at the other side. It will be noted that the outer ends 82 of the teeth on both the adjustor and the shoe are flattened.

Because the adjusting operation becomes increasingly harder if the end 72 of the adjusting tool remains in opening 74 while the adjustor moves inwardly, a second opening 84 may be provided in the shoe web, into which the end 72 of the adjusting tool may be inserted during the later stages of adjustment. Eventually the projecting portion 64 of the adjusting tool will contact the sloping surface 86 of piston 50 and further adjustment will be prevented. The arrangement of the parts is such that the brake lining will be worn down substantially to the rivet heads at the time surface 86 blocks further use of the adjusting tool. This will constitute a warning that the brakes must be relined, and will make it impossible to adjust the shoes to a point where the rivets score the drum.

The extent of inward movement of adjustor 48 will usually be limited by the structural arrangement of the brake. When the available endwise movement of the adjustor has been determined, the angle of the sides of the wedge will have to be made such that the amount of travel of the adjustor will be sufficient to take up the shoe clearance until the entire useful wear of the lining has been obtained.

The brake shoes 18 and 20 are capable both of pivotal movement with respect to the pistons through which they anchor and of sliding movement with respect to said pistons. In order to provide for pivotal movement of the shoes, which is the normal movement of the shoes while they are being brought into engagement with the drum, the shoe ends 88 which are not provided with adjustors are arcuate, or curved, as shown. Furthermore, the anchor-contacting surfaces 90 of the adjustors 48 are arcuate, or curved, in order that, when the shoes anchor through the adjustors, each shoe and adjustor as a unit will be capable of rotating on the surface 90 of the adjustor. If, at the time a given shoe is moved into contact with the drum, it is not so positioned as to be concentric with the drum, then the ends of the shoes are capable of sliding with on the respective pistons to eliminate the eccentricity.

Because the surfaces 90 of the adjustors 48 are curved, or, in other words, formed as the arcs of circles, at any given time there is only one point of contact between each adjustor and the associated piston. This point of contact should be at the center of the piston, or in other words on the axis of the piston and cylinder, and should remain at the center of the piston throughout the adjustment of the brake; i. e., as the adjustor is gradually moved from one extreme position to the other, the point of contact between the adjustor and the piston should remain substantially the same.

I have found that, if the serrated side of the adjustor is formed along a straight line, the point of contact of the adjustor on the piston moves with respect to the piston. This is considered undesirable because movement of the point of contact with respect to the piston increases the tendency of the piston to lock and thus increases the frictional resistance to movement of the piston when the shoe is anchored at the end remote from the adjustor and applying pressure is being exerted through the adjustor.

In order to avoid these difficulties, I form the serrated surface of the adjustor to an arc, the center and radius of which are such that, though the point of contact moves somewhat off center with each brake application during the period before adjustment, when an adjustment is made, the point of contact returns substantially to the center of the piston. This correction occurs with each adjustment through the wear life of the lining.

The manner in which the centers and radii of the two arcs are determined is as follows, the governing geometrical principles being illustrated in Figure 5. The center of the brake drum is at A. Assuming that the direction of rotation of the drum when the vehicle is moving forwardly is indicated by the arrow B, then the point of maximum wear of the brake lining will be found at C. The point D, commonly denominated the instantaneous center of rotation because at any instant the radial center of rotation of the shoe is at this point, is, in the case of a shiftable shoe, found by plotting radii from the ends of the shoe lining and the point located at their intersection. This is demonstrated by reference to Figure 7 in which is shown, in diagram, a shiftable shoe 100. Arrow 102 represents the shoe applying force which acts substantially in the direction indicated upon the end of the shoe 100. As the shoe 100 moves into engagement with its drum it will move in a direction which is the resultant of direction components imposed by the drum and by the force 102. This is illustrated by the arrows 106 and 108, respectively, with the resultant of these two being indicated by reference numeral 110. The lengths of the arrows 106 and 108, respectively, are determined by the actual amount of movement in the two respective directions of the selected point of origin of arrow 108 on shoe 100. The line 112 drawn through this point of origin, perpendicular to the resultant 110 then represents the radius of rotation of this point.

Now, moving to the other end of shoe 100, the selected point on the shoe moves, first, in a direction parallel to the anchor edge against which the heel of the shoe abutts, as represented by arrow 114. By drawing a radius of rotation of this point normal to the arrow 114 until it intersects radius 112 the point or instantaneous center of rotation D is located.

The point C may now be plotted by describing a line through point A, the center of curvature of the shoe, perpendicular to the radius 112 to intersect the shoe 100. This point of intersection with the shoe is point C, the maximum wear point.

Assuming maximum lining wear equal to distance CX, the point C will travel through lineal distance CW when the shoe is rotated about D; so that by describing an arc through C about D until it intersects extended line DA at C', the extended line DW' is found by laying off the distance C' W', which is equal to the distance CW, and drawing a line passing through points D and W'. It will be obvious that the distance between the radius lines D—A and D—W' taken at any distance from the center D will represent the movement of the shoe at the chosen point which corresponds to full lining wear at C. For example, the point F would move to G if the lining was fully worn without changing the position of the adjustor 48.

The next step is the selection of a center H for the arc J which determines the outline of the serrated edge of the shoe web and the engaging side of the adjustor. The position of this center may be varied considerably, but of course within limits, without affecting the solution of the problem under discussion. However, the radius of the arc J should be sufficiently long to make the slope of the adjustor gradual, rather than exceedingly steep. Selecting the point H as the center of arc J at a location below the extended axis MN of piston 50, the point K, which represents the position of the center H corresponding to full lining wear, is now found by drawing radii D—H and D—K from the center D, separated by an angle equal to that between the radii D—A—F and D—W'—G. The radius D—K is now extended indefinitely, say to the point L. The line M—N represents the axis of the cylinder 36 and therefore extends through the center of the piston 50. It will be obvious that the center of the arc which represents the piston-contacting side of adjustor 48 will be located on the line M—N, because only with this arrangement will the point of tangency between the arc O and the piston 50 be located exactly at the center of the piston. The center P of arc O is therefore located on the line M—N at such a point that the distance between the position of the center P and its position corresponding to full lining wear will be substantially bisected by the line D—K—L. In other words, the point P is so located that the line D—K—L will be approximately half-way between P and the point Q, which represents the location of the center of arc O if full lining wear is obtained without adjustment. The location of point Q is determined by drawing an arc R centered at D and marking off a distance equal to the distance between lines D—A—F and D—W'—G at a radial distance from the center D equal to the radius of the arc R.

It should be noted that a definite ratio exists between the radii of the two arcs J and O. When point H is situated below the extended axis MN, the radius of arc O must be somewhat larger than that of arc J. However, if point H is located above the line MN, the reverse condition must prevail, i. e. the radius of arc O must be somewhat smaller than that of arc J. If this latter relationship is chosen, the only difference in result will be that the wedge 48 will be turned end-for-end, 180°, with the narrow wedge end being at the top. As a practical matter, the ratio of radii lengths is chosen to provide a desired increment of adjustment of shoe-to-drum clearance for a given radially inward movement of the wedge so that by varying the lengths of the radii, the angle of the wedge 48 will be correspondingly varied.

With the point H as the center of arc J, and the point P as the center of arc O, the arrangement is such that the smooth surface of the adjustor will be tangent with the piston at substantially the center of the piston after each adjustment is made to compensate for lining wear.

The truth of this can be briefly demonstrated as follows. Assume that the lining of the shoe has been fully worn and that the shoe has moved to a position in which the arc J is illustrated by the dotted line.

The center of arc J is now at K. If the adjustor 48 has followed up the shoe, it will be spaced a considerable distance from the piston, and it will be necessary to move the adjustor inwardly to bring it once more into contact with the piston. At this moment the center of the arc O is at Q, since the adjustor has followed the end of the shoe. In moving the adjustor inwardly to take up the clearance, it will be rotated about the center K, since it moves along the arc J. In moving the adjustor into adjusted position, as it rotates about the center K, the center of arc O will also rotate about point K, along the arc S, and will move from Q to P because, as previously indicated, point K is on a line bisecting the arc generated by point P about center D for full lining wear. This condition of point P returning exactly to line MN with adjustment occurs only on the final adjustment for full lining wear. However, it can be demonstrated that for all previous adjustments for any increment of lining wear the point moves so nearly back to line MN that for all practical purposes it may be assumed to be substantially on the line MN. This demonstration will follow the same procedure as outlined above for finding the centers and radii of the two edges on adjustor 48 but with angular movements corresponding to the smaller increment of lining wear rather than the angular movement corresponding to the full lining wear. This will bring the point of tangency of the adjustor and the piston to the approximate center of the piston, the final position of the adjustor being illustrated in dotted lines.

From the foregoing description, it will apparent that my improved adjustor is of a very simple and inexpensive construction, and that it can be manipulated with ease. Furthermore, it satisfies all of the requirements for correct and efficient operation.

Although a particular embodiment of my invention has been described, it will be understood by those skilled in the art that the object of the invention may be attained by the use of constructions different in certain respects from that disclosed without departing from the underlying principles of the invention.

I claim:

1. An adjustable friction member comprising a T-section shoe having a lined rim and a web perpendicular thereto, said rim being adapted to contact a drum member to develop friction but normally being spaced therefrom, said web having a curved serrated surface formed at one end thereof to provide cam shaped teeth of predetermined height, an adjustor for changing the retracted position of the shoe constituted by a substantially wedge-shaped member having teeth formed on one side thereof in matching engagement with the teeth on the serrated end of the shoe web, an anchor member contacting the opposite side of the adjustor, the anchor-contacting surface of the adjustor being slightly convexly curved to permit rotation of the shoe and adjustor as a unit, means yieldably urging the shoe toward the anchor and thereby causing the adjustor to be retained in a given selected position, and means for moving said adjustor in an approximately radial direction to advance the adjustor teeth in contact with the teeth on the shoe, the height of the teeth determining the minimum clearance between the shoe and the drum for each adjustment, the curvature of the serrated web surface being of such radius as to cause said adjustor to engage said anchor member at substantially the same point after each adjustment has been made.

2. A brake and means for adjusting the same comprising a supporting plate, a T-section brake shoe carried by the supporting plate, a positioning member mounted on the supporting plate and arranged to locate the shoe in released position, said positioning member having a slotted portion adapted to guide the shoe laterally, a generally wedge-shaped adjustor between the end of the shoe and the positioning member constituted by a flat irregular polygonal member lying in the plane of the shoe web and movable in an approximately radial direction with respect to the shoe and the positioning member to increase the distance therebetween, the end surface of the shoe web and one side of the adjustor being formed with matching engaging teeth of predetermined height which normally prevent movement of the adjustor with respect to the shoe, the adjustor and the end of the shoe web being guided in the slot provided by the positioning member, the side of the adjustor which engages the positioning member being arcuate in order to permit pivotal movement of the adjustor and shoe as a unit on the positioning member, the opposite toothed surface of the adjustor also having a generally arcuate form, the centers and radii of the arcs on which the opposite sides of the adjustor are formed being such as to locate the point of engagement substantially at the center of the positioning member in all phases of adjustment, the height of the adjustor teeth being sufficient to insure an adequate minimum clearance between the brake shoe and a cooperating brake drum after adjustment, and a return spring normally holding the shoe and adjustor against the positioning member.

3. A brake and an adjusting device therefor comprising a supporting plate, a T-section brake shoe carried by the supporting plate, a shoe positioning member having a slotted portion, an arcuate wedge-shaped adjustor between the end of the shoe and the positioning member constituted by a flat member lying in the plane of the shoe web and movable in an approximately radial direction with respect to the shoe and the positioning member to increase the distance therebetween, the end surface of the shoe web and one side of the adjustor being formed with matching cam shaped engaging teeth of predetermined height which normally prevent movement of the adjustor with respect to the shoe, said teeth being formed to provide increments of adjustment for spacing said web end from said positioning member, the pitch of the teeth providing range of adjustment and the height of the teeth providing minimum clearance adjustment between the brake shoe and a cooperating brake drum, the adjustor and the end of the shoe web being guided in the slot provided in the positioning member, and one or more return springs normally holding the shoe and adjustor against the positioning member.

4. A brake and an adjusting device therefor comprising a brake shoe, a shoe positioning member, and a wedge-shaped adjustor having arcuate surfaces between the end of the shoe and the positioning member movable in an approximately radial direction with respect to the shoe and the positioning member to increase the distance therebetween, the end surface of the shoe and one side of the adjustor being formed with matching cam shaped engaging teeth of predetermined height which normally prevent movement of the adjustor with respect to the shoe, said teeth being formed with a slope to provide increments of linear adjustment and a height to provide minimum clearance for spacing said brake shoe from a cooperating drum.

BRYAN E. HOUSE.

References Cited in the file of this patent

UNITED STATES PATENTS

| Number | Name | Date |
| --- | --- | --- |
| 1,939,584 | White | Dec. 12, 1933 |
| 2,189,226 | Ryan | Feb. 6, 1940 |
| 2,210,336 | Payne | Aug. 16, 1940 |
| 2,258,893 | Humphrey | Oct. 14, 1941 |
| 2,326,177 | Schnell | Aug. 10, 1943 |
| 2,337,070 | Alden et al. | Dec. 21, 1943 |
| 2,400,468 | Sacher | May 14, 1946 |
| 2,475,492 | Goepfrich et al. | July 5, 1949 |